(12) United States Patent
Ricci et al.

(10) Patent No.: US 11,155,734 B1
(45) Date of Patent: Oct. 26, 2021

(54) SEDIMENT MIXTURE CONFIGURED TO BE USED AS AN ABRASIVE AGENT

(71) Applicant: 10X Engineered Materials, LLC, Wabash, IN (US)

(72) Inventors: Stephen Michael Ricci, Hilliard, OH (US); Calvin Wade Wohlert, Centennial, CO (US)

(73) Assignee: 10X Engineered Materials, LLC, Wabash, IN (US)

( * ) Notice: Subject to any disclaimer, the term of this patent is extended or adjusted under 35 U.S.C. 154(b) by 99 days.

(21) Appl. No.: 16/519,321

(22) Filed: Jul. 23, 2019

Related U.S. Application Data

(60) Provisional application No. 62/702,204, filed on Jul. 23, 2018.

(51) Int. Cl.
*C09K 3/14* (2006.01)

(52) U.S. Cl.
CPC .................... *C09K 3/1409* (2013.01)

(58) Field of Classification Search
CPC .................................................... C09K 3/1409
See application file for complete search history.

(56) References Cited

U.S. PATENT DOCUMENTS

| | | | | | |
|---|---|---|---|---|---|
| 4,458,747 | A * | 7/1984 | Berry | ...................... | F28D 15/00 165/104.19 |
| 5,409,415 | A * | 4/1995 | Kawanami | .............. | B24C 11/00 451/39 |
| 5,424,257 | A | 6/1995 | Schat et al. | | |
| 5,496,392 | A | 3/1996 | Sims et al. | | |
| 6,897,173 | B2 | 5/2005 | Bernard et al. | | |
| 8,563,449 | B2 | 10/2013 | Mueller et al. | | |
| 9,796,635 | B1 | 10/2017 | Luan et al. | | |
| 2003/0180537 | A1 * | 9/2003 | Meyer | ..................... | B24C 11/00 428/404 |
| 2009/0252941 | A1 | 10/2009 | Mueller et al. | | |
| 2015/0101257 | A1 * | 4/2015 | Tsubone | .................... | C04B 5/06 51/308 |
| 2017/0226410 | A1 * | 8/2017 | Enderle | .................. | C09K 8/805 |

OTHER PUBLICATIONS

ASTM International, ASTM Standard C128-15, "Standard Test Method for Relative Density (Specific Gravity) and Absorption of Fine Aggregate", published Mar. 2015, pp. 1-6.

ASTM International, ASTM Standard C136-06, "Standard Test Method for Sieve Analysis of Fine and Coarse Aggregates", published Mar. 2006, pp. 1-5.

ASTM International, ASTM Standard E11, "Standard Specification for Woven Wire Test Sieve Cloth and Test Sieves", published Apr. 2017, pp. 1-12.

(Continued)

*Primary Examiner* — Pegah Parvini
(74) *Attorney, Agent, or Firm* — The Law Office of Patrick F. O'Reilly III, LLC

(57) ABSTRACT

A sediment mixture configured to be used as an abrasive agent is disclosed herein. The sediment mixture includes a plurality of component particles comprising particle shapes selected from the group consisting of: (i) an approximately spherical shape, (ii) an approximately tear-drop shape, (iii) an approximately cylindrical shape, (iv) a truncated ellipsoidal shape, (v) a dog-bone or hour-glass shape, and (vi) combinations thereof.

15 Claims, 3 Drawing Sheets

(56) References Cited

OTHER PUBLICATIONS

ASTM International, ASTM Standard D4940-15e1, "Standard Test Method for Conductimetric Analysis of Water Soluble Ionic Contamination of Blast Cleaning Abrasives", published Dec. 2015, pp. 1-3.

National Institute for Occupational Safety and Health (NIOSH), NIOSH Manual of Analytical Methods (NMAM), "Silica, Crystalline, by XRD: Method 7500", Issue 4, Fourth Edition, dated Mar. 15, 2003, pp. 1-9.

\* cited by examiner

SEDIMENT MIXTURE CONFIGURED TO BE USED AS AN ABRASIVE AGENT

CROSS-REFERENCE TO RELATED APPLICATIONS

This patent application claims priority to, and incorporates by reference in its entirety, U.S. Provisional Patent Application No. 62/702,204, entitled "Sediment Mixture Configured To Be Used As An Abrasive Agent", filed on Jul. 23, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL IN APPENDIX

Not Applicable

BACKGROUND OF THE INVENTION

1. Field of the Invention

The invention generally relates to a sediment mixture configured to be used as an abrasive agent. More particularly, the invention relates to an abrasive sediment mixture with unique material and abrasive properties.

2. Background

Granular abrasive materials are used in a wide variety of products and applications to clean, remove coatings from, remove corrosion from, polish, etch, or otherwise condition the surface of another material. Granular abrasives vary in their particle-size range (e.g., fine, medium, coarse), hardness, brittleness, bulk density, particle density, particle shape, particle angularity or sharpness, and other properties. The applications best suited for a granular abrasive depend on these properties and the surface requirements for the part or material being cleaned or otherwise treated by the abrasive.

Conventional abrasive materials are generally homogeneous in shape and each material is therefore suitable for use in a limited number of applications.

Conventional abrasive materials generally possess a uniform level of angularity, or sharpness, among the constituent particles. Conventional abrasives are commonly described as angular, sub-angular, sub-rounded, or rounded. Each shape class is generally used, or is able, to achieve specific objectives. Angular and sub-angular abrasives may be used to remove hard coatings or to achieve a greater degree of unevenness (profile) in a treated surface, while more rounded abrasives may be more effective in removing softer coatings, oil, or dirt from surfaces without damaging the surface, or without substantially changing the existing surface profile.

Conventional abrasive materials generally have a uniform distribution of aspect ratio, or the ratio of maximum extent (length, width, or height) to minimum extent (length, width, or height). Most conventional abrasive materials contain constituent particles with an aspect ratio near a value of one. Materials with a uniform distribution of aspect ratios, or whose particles have an aspect ratio of approximately one, will generally be accelerated in a stream of pressurized water, air, or other carrier fluid to a similarly uniform distribution of translational and rotational velocities, or states of translational and rotational kinetic energy, prior to contacting a surface to be treated.

It is difficult, if not impossible, to blast or otherwise abrade a surface using a conventional abrasive in a carrier fluid such that the particles arrive at a surface in a spectrum, or distribution, of energy states, each of which may produce a different result or achieve a different objective on the treated surface. Higher-energy particles may, for example, induce a break in a difficult-to-remove coating, while particles in a lower energy state could assist in separating and removing the coating from the treated surface. In addition, higher-energy particles may induce a desired profile, or unevenness, in a treated surface while lower-energy particles clean and renew the surface. Sequential application of conventional abrasive materials is often required to achieve multiple objectives, such as a certain profile, cleanliness, and appearance.

Therefore, what is needed is an abrasive sediment mixture that, unlike conventional abrasive materials, is non-homogeneous in shape but also possesses other properties that qualify it as an abrasive. This non-homogeneity could make the abrasive mixture useful in a broader set of applications compared with conventional abrasive materials. Further, there is a need for an abrasive sediment mixture that can be cost effectively employed in a variety of different applications, or that can accomplish multiple objectives in one pass using a single abrasive material.

BRIEF SUMMARY OF EMBODIMENTS OF THE INVENTION

Accordingly, the present invention is directed to a sediment mixture configured to be used as an abrasive agent that substantially obviates one or more problems resulting from the limitations and deficiencies of the related art.

In accordance with one or more embodiments of the present invention, there is provided a sediment mixture configured to be used as an abrasive agent. The sediment mixture includes a plurality of component particles comprising particle shapes selected from the group consisting of: (i) an approximately spherical shape, (ii) an approximately tear-drop shape, (iii) an approximately cylindrical shape, (iv) a truncated ellipsoidal shape, (v) a dog-bone or hourglass shape, and (vi) combinations thereof.

In a further embodiment of the present invention, the specific gravity of the material forming the plurality of component particles is between approximately 1.0 and approximately 5.0 as measured by ASTM C128-15, "Standard Test Method for Density, Relative Density (Specific Gravity), and Absorption of Fine Aggregate."

In yet a further embodiment, the plurality of component particles include non-metallic solids formed from greater than 99% amorphous glass.

In still a further embodiment, greater than 99% by mass of the plurality of component particles are capable of passing through a Number 5 mesh sieve as defined by ASTM E11.

In yet a further embodiment, at least 90% by mass of the plurality of component particles do not pass through a Number 400 mesh sieve as defined by ASTM E11.

In still a further embodiment, the plurality of component particles include non-metallic particles having a hardness index on the Mohs scale between 4.0 and 9.0.

In yet a further embodiment, a mixture of the plurality of component particles with deionized water produces a slurry with conductivity between 0 and 300 microsiemens per centimeter when measured in accordance with ASTM D4940-15e1, "Standard Test Method for Conductimetric Analysis of Water Soluble Ionic Contamination of Blasting Abrasives."

In still a further embodiment, the plurality of component particles have less than 0.1% by weight of quartz, tridymite, and cristobalite when measured in accordance with test method NIOSH Method 7500.

In yet a further embodiment, the plurality of component particles have a bulk density of between approximately 70 pounds per cubic foot and approximately 150 pounds per cubic foot.

In still a further embodiment, the plurality of component particles comprise at least two particle shapes selected from the group consisting of: (i) an approximately spherical shape, (ii) an approximately tear-drop shape, (iii) an approximately cylindrical shape, (iv) a truncated ellipsoidal shape, and (v) a dog-bone or hour-glass shape.

In yet a further embodiment, the plurality of component particles comprise at least three particle shapes selected from the group consisting of: (i) an approximately spherical shape, (ii) an approximately tear-drop shape, (iii) an approximately cylindrical shape, (iv) a truncated ellipsoidal shape, and (v) a dog-bone or hour-glass shape.

In still a further embodiment, the component particles of the abrasive sediment mixture of mesh size 40-70 have a breakdown less than 30% in accordance with ASTM C136-06 "Standard Test Method for Sieve Analysis of Fine and Coarse Aggregates", wherein the breakdown is defined as the mass percentage of particles that pass through a Number 70 mesh sieve as defined by ASTM E11 after blasting cold-rolled carbon steel perpendicularly at a nozzle distance of 18 inches with air at a nozzle pressure of at least 80 pounds per square inch.

In yet a further embodiment, the component particles of the abrasive sediment mixture of mesh size 20-40 have a breakdown less than 60% in accordance with ASTM C136-06 "Standard Test Method for Sieve Analysis of Fine and Coarse Aggregates", wherein the breakdown is defined as the mass percentage of particles that pass through a Number 40 mesh sieve as defined by ASTM E11 after blasting cold-rolled carbon steel perpendicularly at a nozzle distance of 18 inches with air at a nozzle pressure of at least 80 pounds per square inch.

In still a further embodiment, at least some of the component particles of the abrasive sediment mixture are tempered such that outer surfaces of the at least some of the component particles of the abrasive sediment mixture are in compression, and interiors of the at least some of the component particles of the abrasive sediment mixture are in tension.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

An illustrative embodiment of an abrasive sediment mixture will be described with reference to FIGS. 1-7. Initially, a raw material mixture contains, as a subset, the abrasive sediment mixture 10 depicted in FIG. 1. The raw material mixture contains materials and particles that are either larger or less dense than the component particles in 10. In the illustrative embodiment, the raw material undergoes a plurality of different processing stages prior to the forming of the abrasive sediment mixture 10. More particularly, the raw material is placed into a primary separation device to remove particles and other material larger than the particles comprising the abrasive mixture 10. After the processing of the raw material by the primary separation device, a subset material is produced. Then, the subset material is placed into a secondary separation device for further processing to remove materials and particles that are less dense than the particles comprising the abrasive mixture 10. In the illustrative process, after the subset material is processed in the secondary separation device, the abrasive sediment mixture 10 described hereinafter is formed.

Figure 1:
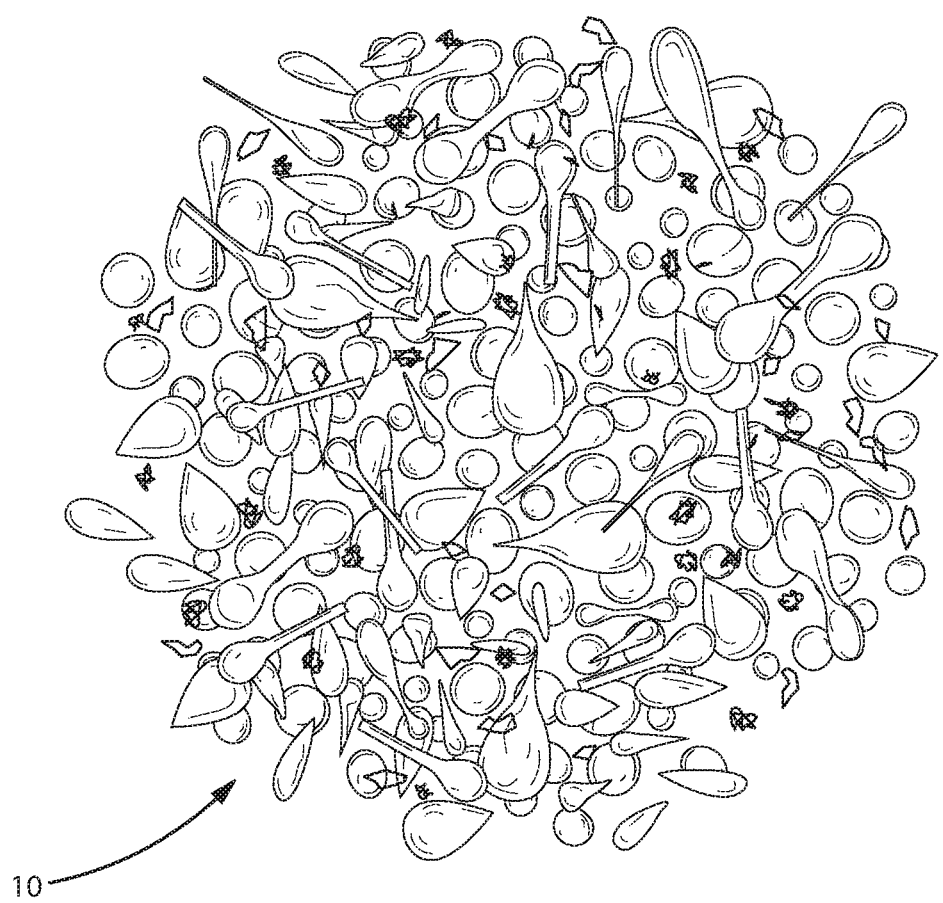
FIG. 1 is an illustration of an abrasive sediment mixture, according to an illustrative embodiment of the invention.
Figure 2:
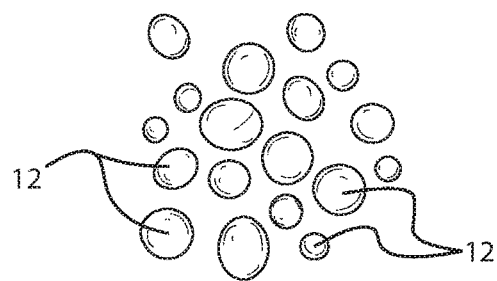
FIG. 2 is an illustration of particles forming a portion of the abrasive sediment mixture, wherein the illustrated particles have an approximately spherical shape.
Figure 3:
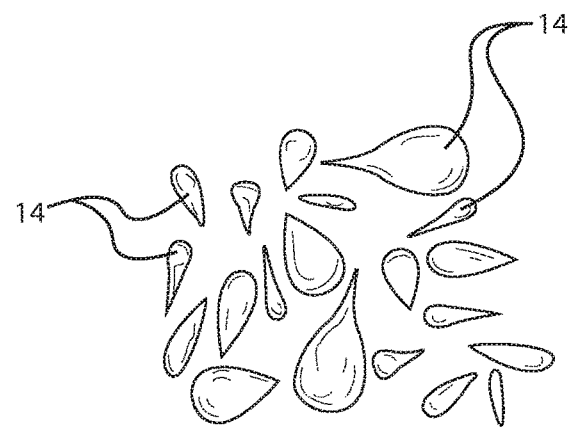
FIG. 3 is an illustration of particles forming another portion of the abrasive sediment mixture, wherein the illustrated particles have an approximately tear-drop shape.
Figure 4:
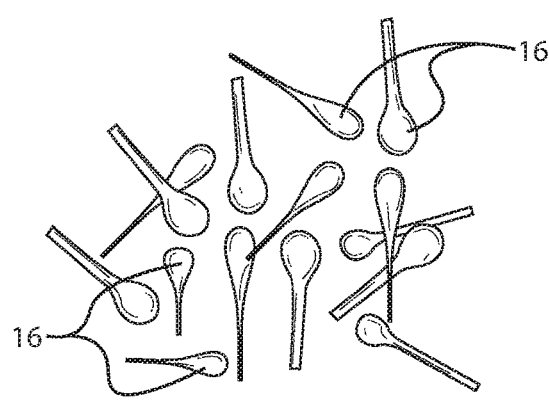
FIG. 4 is an illustration of particles forming yet another portion of the abrasive sediment mixture, wherein the illustrated particles have an approximately tear-drop shape with tails.
Figure 5:
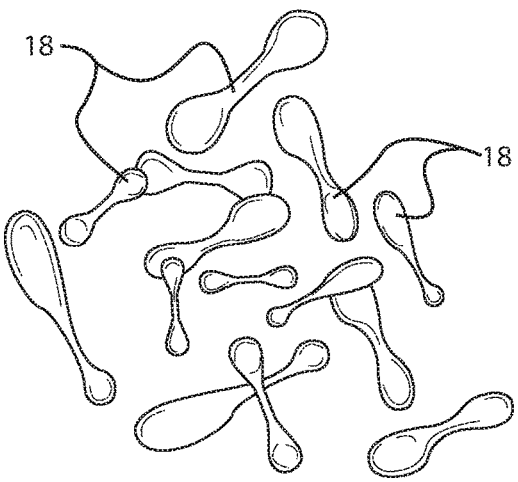
FIG. 5 is an illustration of particles forming still another portion of the abrasive sediment mixture, wherein the illustrated particles have an approximately dog-bone or hour-glass shape.
Figure 6:
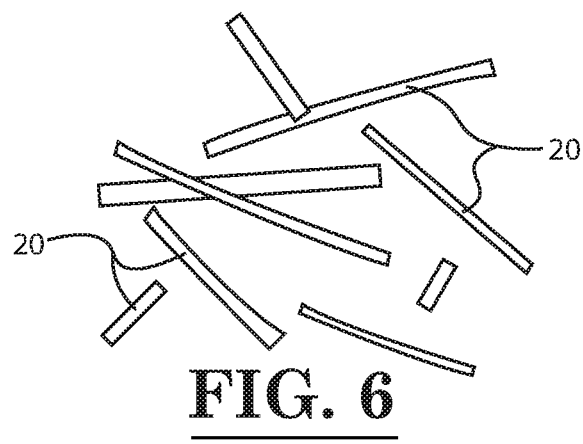
FIG. 6 is an illustration of particles forming yet another portion of the abrasive sediment mixture, wherein the illustrated particles have an approximately cylindrical shape or rod-like shape.

Now, referring particularly to FIGS. 2-6, the illustrative embodiment of the abrasive sediment mixture will be explained in further detail. In the illustrative embodiment, the abrasive sediment mixture comprises a plurality of component particles with different particle shapes. For example, as shown in FIG. 2, some of the component particles of the abrasive sediment mixture may have an approximately spherical shape 12 or truncated ellipsoidal shape (e.g., flattened droplets). As another example, other component particles of the abrasive sediment mixture may have an approximately tear-drop shape 14 (see FIG. 3) or an approximately tear-drop shape with an elongated rod-like tail 16 (see FIG. 4). As yet another example, other component particles of the abrasive sediment mixture may have an approximately dog-bone or hour-glass shape 18 (see FIG. 5). As still another example, other component particles of the abrasive sediment mixture may have an approximately cylindrical shape or rod-like shape 20 with various lengths and diameters (see FIG. 6). As yet another example, other component particles of the abrasive sediment mixture may comprise coal-like particles with flat or curved surfaces and sharp edges. In the illustrative embodiment, the abrasive sediment mixture may comprise one of these aforementioned shapes, a plurality of particular ones of these aforementioned shapes, or a combination of all of these aforementioned shapes.

Figure 7:
FIG. 7 is an illustration of other particles present in the abrasive sediment mixture that possess flat surfaces and sharp edges.

In the illustrative embodiment, in addition to the particles having the various shapes described above, the abrasive sediment mixture 10 also includes other particles that have flat or curved surfaces and sharp edges 22 (refer to FIG. 7).

In the illustrative embodiment, the specific gravity of the material forming the component particles of the abrasive sediment mixture may be between approximately 1.0 and approximately 5.0 (or between 1.0 and 5.0) as measured by ASTM C128-15, "Standard Test Method for Density, Relative Density (Specific Gravity), and Absorption of Fine Aggregate." In one or more other illustrative embodiments, the specific gravity of the material forming the component particles of the abrasive sediment mixture may be between approximately 2.4 and approximately 2.9 (or between 2.4 and 2.9) as measured by ASTM C128-15, "Standard Test Method for Density, Relative Density (Specific Gravity), and Absorption of Fine Aggregate."

In the illustrative embodiment, the component particles of the abrasive sediment mixture may include non-metallic solids formed from greater than 99% amorphous (non-crystalline) glass.

In the illustrative embodiment, greater than 99% by mass of the component particles of the abrasive sediment mixture may be capable of passing through a Number 5 mesh sieve as defined by ASTM E11. Also, in the illustrative embodiment, at least 90% by mass of the component particles of the abrasive sediment mixture do not pass through a Number 400 mesh sieve as defined by ASTM E11.

In the illustrative embodiment, the component particles of the abrasive sediment mixture may have a size between approximately 0.05 millimeters and approximately 2.5 millimeters (or between 0.05 and 2.5 millimeters). For example, the component particles of the abrasive sediment mixture may comprise coarse abrasive particles between approximately 0.850 millimeters and approximately 2.5 millimeters (or between 0.850 and 2.5 millimeters), medium abrasive particles between approximately 0.425 millimeters and approximately 0.850 millimeters (or between 0.425 and 0.850 millimeters), and fine abrasive particles between approximately 0.05 millimeters and approximately 0.425 millimeters (or between 0.05 and 0.425 millimeters).

In the illustrative embodiment, the component particles of the abrasive sediment mixture may include non-metallic particles having a hardness index on the Mohs scale between 4.0 and 9.0.

In the illustrative embodiment, a mixture of the component particles of the abrasive sediment mixture with deionized water may produce a slurry with conductivity between 0 and 300 microsiemens per centimeter when measured in accordance with ASTM D4940-15e1, "Standard Test Method for Conductimetric Analysis of Water Soluble Ionic Contamination of Blasting Abrasives."

In the illustrative embodiment, the component particles of the abrasive sediment mixture may have greater than 1% by weight of each of aluminum, calcium, potassium, magnesium, sodium, and silicon. Also, in the illustrative embodiment, the component particles of the abrasive sediment mixture may have less than 0.1% by weight of quartz, tridymite, and cristobalite when measured in accordance with test method National Institute for Occupational Safety and Health ("NIOSH") Method 7500.

In the illustrative embodiment, the component particles of the abrasive sediment mixture may have a bulk density of between approximately 70 pounds per cubic foot and approximately 150 pounds per cubic foot (or between 70 pounds per cubic foot and 150 pounds per cubic foot). In one or more other illustrative embodiments, the component particles of the abrasive sediment mixture may have a bulk density of between approximately 70 pounds per cubic foot and approximately 110 pounds per cubic foot (or between 70 pounds per cubic foot and 110 pounds per cubic foot).

In the illustrative embodiment, the abrasive sediment mixture may be further described in terms of its breakdown and dust generation rates. The recyclability of an abrasive is typically judged by its ability to clean and generate the required surface profile depth after reuse and is determined by measuring particle size distribution before and after blasting with the abrasive material. Particles that break after impact with a surface will pass through a sieve that would otherwise retain them prior to blasting. Breakdown is the mass percentage of material that passes through a sieve with an opening that would not permit passage of 100% of the material prior to blasting. In the illustrative embodiment, the component particles of the abrasive sediment mixture of mesh size 40-70 may have a breakdown between approximately 20% and approximately 25% (or between 20% and 25%), in accordance with ASTM C136-06 "Standard Test Method for Sieve Analysis of Fine and Coarse Aggregates." In the illustrative embodiment, the component particles of the abrasive sediment mixture of mesh size 20-40 may have a breakdown between approximately 50% and approximately 55% (or between 50% and 55%), in accordance with ASTM C136-06 "Standard Test Method for Sieve Analysis of Fine and Coarse Aggregates." In the illustrative embodiment, breakdown is defined as the mass percentage of particles that pass through a Number 70 mesh sieve as defined by ASTM E11 after blasting cold-rolled carbon steel perpendicularly at a nozzle distance of 18 inches with air at a nozzle pressure of at least 80 pounds per square inch.

In the illustrative embodiment, the abrasive sediment mixture also may be further described in terms of its cleaning rate. Cleaning rate is the area of substrate surface that can be fully cleaned per unit of time. This rate depends upon specific testing conditions and is influenced by pressure, nozzle distance, nozzle type, operator, coating being removed and other factors. This cleaning rate, along with abrasive consumption rate, governs the cost effectiveness of the blasting operation. In the illustrative embodiment, the abrasive sediment mixture exhibits a cleaning rate between approximately 100 square foot per hour and approximately 350 square foot per hour (or between 100 square foot per hour and 350 square foot per hour) depending upon operating conditions and applications.

In the illustrative embodiment, the abrasive sediment mixture may be tempered. Tempering puts the outer surfaces of the component particles of the abrasive sediment mixture into compression and the interior of the particles into tension. In the illustrative embodiment, the abrasive sediment mixture is heated to a temperature of more than 600 degrees Celsius. The abrasive sediment mixture then undergoes a high-pressure cooling procedure called "quenching." Quenching cools the outer surfaces of the component particles more quickly than the centers of the component particles. As a result, the centers of the component particles of the abrasive sediment mixture remain in tension, and the outer surfaces of the component particles go into compression, which gives the abrasive sediment mixture its strength.

In the illustrative embodiment, the abrasive sediment mixture also may be further described in terms of its surface profile. Surface profile or anchor pattern is generally considered a measurement of the maximum peak to valley depth of the roughness resulting from high-velocity abrasive impingement to a surface. A profile effectively increases the surface area of the substrate, providing "tooth" which promotes coating system adhesion to the substrate. The anchor pattern is typically dictated by the size of the abrasive employed. In general, larger sized abrasives generate a deeper surface profile than comparatively smaller size abrasives. Profile depth is critical and has a direct relationship to the thickness of the coating system being applied. Too shallow a surface profile may result in poor adhesion of the coating system. Conversely, too deep of a surface profile may result in pinpoint rusting due to rogue peaks of the profile protruding above the coating film. In the illustrative embodiment, the component particles of the abrasive sediment mixture of mesh size 20-40 may achieve a profile between approximately 2 mil and approximately 5 mil (or between 2 mil and 5 mil, where "mil" is one-thousandths of an inch), depending upon conditions of blasting (e.g., pressure, nozzle type and distance, operator). In the illustrative embodiment, the component particles of the abrasive sediment mixture of mesh size 40-70 may achieve a profile between approximately 1.5 mil and approximately 4 mil (or between 1.5 mil and 4 mil). Both mesh size ranges of the abrasive sediment mixture using cold-rolled carbon steel as a substrate.

In the illustrative embodiment, the abrasive sediment mixture may comprise a granular sediment mixture that is derived from any molten mineral material that is simultaneously cooled with air or water while being atomized into droplets using a nozzle with air or liquid, a perforated surface, a spinning cup, a spinning disk, or other atomizing device. The subject abrasive sediment mixture is formed when a portion of the atomized molten mineral liquid is cooled and frozen before the atomized droplets are able form spheres by surface tension. The atomized and refrozen melt droplets are formed into a granular abrasive material in a size range between approximately 0.05 millimeters and approximately 2.5 millimeters (or between 0.05 millimeters and 2.5 millimeters).

In another alternative embodiment, the abrasive sediment mixture may comprise a granular sediment mixture that is not derived from a process to atomize and freeze a molten mineral.

In the illustrative embodiment, the abrasive sediment mixture may be used as a surface blasting agent or incorporated into a variety of other abrasive products like sand paper.

It is readily apparent that the aforedescribed abrasive sediment mixture offers numerous advantages. First, the abrasive sediment mixture has unique abrasive properties that are not found in conventional abrasive materials, such as the non-homogeneous shapes and aspect ratios of its constituent particles. Advantageously, this non-homogeneity makes the abrasive mixture useful in a broader set of applications, or to achieve multiple abrasive treatment objectives with one material, compared with conventional abrasive materials. Secondly, the aforedescribed abrasive sediment mixture has suitable properties for many different abrasive applications. Finally, the aforedescribed abrasive sediment mixture is able to be cost effectively employed in a variety of different applications.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A sediment mixture configured to be used as an abrasive agent, the sediment mixture comprising:
    a plurality of component particles comprising at least four different particle shapes selected from the group consisting of: (i) an approximately spherical shape, (ii) an approximately tear-drop shape, (iii) an approximately cylindrical shape, (iv) a truncated ellipsoidal shape, and (v) a dog-bone or hour-glass shape.

2. The sediment mixture according to claim 1, wherein the specific gravity of the material forming the plurality of component particles is between approximately 1.0 and approximately 5.0 as measured by ASTM C128-15, "Standard Test Method for Density, Relative Density (Specific Gravity), and Absorption of Fine Aggregate".

3. The sediment mixture according to claim 1, wherein the plurality of component particles include non-metallic solids having greater than 99% amorphous glass.

4. The sediment mixture according to claim 1, wherein greater than 99% by mass of the plurality of component particles are capable of passing through a Number 5 mesh sieve as defined by ASTM E11.

5. The sediment mixture according to claim 1, wherein at least 90% by mass of the plurality of component particles do not pass through a Number 400 mesh sieve as defined by ASTM E11.

6. The sediment mixture according to claim 1, wherein the plurality of component particles include non-metallic particles having a hardness index on the Mohs scale between 4.0 and 9.0.

7. The sediment mixture according to claim 1, wherein a mixture of the plurality of component particles with deionized water produces a slurry with conductivity between 0 and 300 microsiemens per centimeter when measured in accordance with ASTM D4940-15e1, "Standard Test Method for Conductimetric Analysis of Water Soluble Ionic Contamination of Blasting Abrasives".

8. The sediment mixture according to claim 1, wherein the plurality of component particles have less than 0.1% by weight of quartz, tridymite, and cristobalite when measured in accordance with test method NIOSH Method 7500.

9. The sediment mixture according to claim 1, wherein the plurality of component particles have a bulk density of between approximately 70 pounds per cubic foot and approximately 150 pounds per cubic foot.

10. The sediment mixture according to claim 1, wherein the plurality of component particles comprise all of the following particles shapes: (i) an approximately spherical shape, (ii) an approximately tear-drop shape, (iii) an approximately cylindrical shape, (iv) a truncated ellipsoidal shape, and (v) a dog-bone or hour-glass shape.

11. The sediment mixture according to claim 1, wherein the component particles of the abrasive sediment mixture of mesh size 40-70 have a breakdown less than 30% in accordance with ASTM C136-06 "Standard Test Method for Sieve Analysis of Fine and Coarse Aggregates".

12. The sediment mixture according to claim 1, wherein the component particles of the abrasive sediment mixture of mesh size 20-40 have a breakdown less than 60% in accordance with ASTM C136-06 "Standard Test Method for Sieve Analysis of Fine and Coarse Aggregates".

13. The sediment mixture according to claim 1, wherein at least some of the component particles of the abrasive sediment mixture have outer surfaces that are in compression and interiors that are in tension.

14. A sediment mixture configured to be used as an abrasive agent, the sediment mixture comprising:

a plurality of component particles comprising at least four different particle shapes selected from the group consisting of: (i) an approximately spherical shape, (ii) an approximately tear-drop shape, (iii) an approximately cylindrical shape, (iv) a truncated ellipsoidal shape, and (v) a dog-bone or hour-glass shape;

wherein the plurality of component particles include non-metallic solids having greater than 99% amorphous glass.

15. The sediment mixture according to claim 14, wherein the plurality of component particles comprise all of the following particles shapes: (i) an approximately spherical shape, (ii) an approximately tear-drop shape, (iii) an approximately cylindrical shape, (iv) a truncated ellipsoidal shape, and (v) a dog-bone or hour-glass shape.

* * * * *